(12) United States Patent
Ferrar et al.

(10) Patent No.: US 11,620,415 B2
(45) Date of Patent: Apr. 4, 2023

(54) AND MANUFACTURE OF GENERALIZED FLOW PROFILE-PRODUCING DEVICES

(71) Applicant: VIRGINIA TECH INTELLECTUAL PROPERTIES, INC., Blacksburg, VA (US)

(72) Inventors: Anthony M. Ferrar, Christiansburg, VA (US); William C. Schneck, Woodbridge, VA (US); Walter F. O'Brien, Blaksburg, VA (US); Kevin M. Hoopes, San Antonio, TX (US); Justin Bailey, Blacksburg, VA (US)

(73) Assignee: VIRGINIA TECH INTELLECTUAL PROPERTIES, INC., Blackburg, VA (US)

( * ) Notice: Subject to any disclaimer, the term of this patent is extended or adjusted under 35 U.S.C. 154(b) by 541 days.

(21) Appl. No.: 16/236,210

(22) Filed: Dec. 28, 2018

(65) Prior Publication Data

US 2019/0138663 A1 May 9, 2019

Related U.S. Application Data

(63) Continuation of application No. 14/795,545, filed on Jul. 9, 2015, now abandoned.

(Continued)

(51) Int. Cl.
*G06F 30/00* (2020.01)
*G06F 30/17* (2020.01)
(Continued)

(52) U.S. Cl.
CPC ............. *G06F 30/00* (2020.01); *G06F 30/17* (2020.01); *G06F 30/20* (2020.01); *G06F 2111/10* (2020.01)

(58) Field of Classification Search
CPC .......... G06F 30/20; G06F 30/00; G06F 30/17; G06F 2111/10
See application file for complete search history.

(56) References Cited

U.S. PATENT DOCUMENTS

| | | | | |
|---|---|---|---|---|
| 2013/0287542 | A1* | 10/2013 | Nichols | F01D 17/165 415/1 |
| 2014/0140846 | A1* | 5/2014 | Birkestrand | F03D 1/0675 416/10 |
| 2015/0300185 | A1* | 10/2015 | Helvaci | G06F 30/17 415/191 |

FOREIGN PATENT DOCUMENTS

WO    WO-2011017780 A2 *  2/2011  ............... F03D 3/02

OTHER PUBLICATIONS

Qureshi, I., and T. Povey. "A combustor-representative swirl simulator for a transonic turbine research facility." Proceedings of the Institution of Mechanical Engineers, Part G: Journal of Aerospace Engineering 225.7 (2011): 737-748. (Year: 2011).*

(Continued)

*Primary Examiner* — Boris Gorney
*Assistant Examiner* — Joshua E. Jensen
(74) *Attorney, Agent, or Firm* — Thomas | Horstemeyer, LLP

(57) ABSTRACT

The present invention provides a process for making a flow conditioning device that transforms an input flow into a desired output flow. The process includes the steps of inputting into a computer program a set of design constraints representative of the input flow and the output flow. The computer program generates a design representative of a flow-conditioning device that transforms the input flow into the output flow. The process then provides the output design to an additive manufacturing or other suitable production system adapted to form a solid representation of the flow-conditioning device.

10 Claims, 3 Drawing Sheets

Related U.S. Application Data

(60) Provisional application No. 62/022,868, filed on Jul. 10, 2014.

(51) Int. Cl.
*G06F 30/20* (2020.01)
*G06F 111/10* (2020.01)

(56) References Cited

OTHER PUBLICATIONS

Buckley, P. L., et al. "The design and combustion performance of practical swirlers for integral rocket/ramjets." AIAA Journal 21.5 (1983): 733-740. (Year: 1983).*

Ferrar, Anthony, et al. "Application of Additive Manufacturing to Rapidly Produce High-Resolution Total Pressure Distortion Screens." 50th AIAA Aerospace Sciences Meeting including the New Horizons Forum and Aerospace Exposition. 2012. (Year: 2012).*

Genssler, H. P., W. Meyer, and L. Fottner. Development of intake swirl generators for turbo jet engine testing. Messerschmitt-Boelkow-Blohm Gmbh Munich (Germany FR) Helicopterand Military Aircraft Group, 1987. (Year: 1987).*

Hamstra et al; Active Inlet Flow Control Technology Demonstration; ICAS 2000 Congress; The Aeronautical Journal 104. 1040 (2000) 476-479; 10 pages; Lockheed Martin; US.

Hoopes, Kevin; A New Method for Generating Swirl Inlet distortion for Jet Engine Research; Master's Thesis; Virginia Tech, Jun. 7, 2013; 139 pages; US.

Hoopes et al.; The Stream Vane Method: a New Way to Generate Swirl Distortion for Jet Engine Research; 49th AIAA/ASME/SAE/ASEE Joint Propulsion Conference; Jul. 14-17, 2013; American Institute of Aeronautics and Astronautics, Inc.; 11 pages; San Jose, CA.

Sheoran et al; A Versatile Design of a Controlled Swirl distortion Generator for TEsting Gas Turbine Engines; ASME Paper No. GT2008-50657; 12 pages; Presented Jun. 9-13, 2008; Berlin, DE.

* cited by examiner

AND MANUFACTURE OF GENERALIZED
FLOW PROFILE-PRODUCING DEVICES

RELATED APPLICATIONS

This application claims the benefit of U.S. Provisional Application No. 62/022,868 filed Jul. 10, 2014 and herein incorporated by reference.

STATEMENT REGARDING FEDERALLY
SPONSORED RESEARCH & DEVELOPMENT

This invention was made with government support under Contract No. NNL09AA00A awarded by the National Aeronautics and Space Administration. The government has certain rights in the invention.

INCORPORATION BY REFERENCE OF
MATERIAL SUBMITTED ON A COMPACT
DISC

Not applicable.

BACKGROUND OF THE INVENTION

In many fluids applications, a flow-conditioning device that can produce a desired flow field is needed. Current methods applied to aircraft engines typically produce total pressure profiles by means of wire-mesh screens. Segments of varying porosity wire-meshes produce different amounts of total pressure losses depending on the porosity of the screen and the inlet flow conditions.

The performance of wire-mesh screens is difficult to predict, and construction of a device is limited to available wire-mesh porosities. The result is that multiple wire-mesh screens are often designed, constructed, and tested before the desired total pressure profile is achieved. Often, even after multiple iterations, the resulting profile does not match the desired profile due to wire-mesh porosity availability.

Other current methods produce swirl (or velocity) profiles by means of guide vanes. These vanes turn the flow from one direction to another. The possible flow velocity profiles are limited by the manufacturability of the guide vanes. In all cases, guide vanes are only capable of producing relatively simple swirl profiles.

Thus, for the aircraft engine applications there is a need for a method in which a detailed, complex flow field may be created by a flow-conditioning device. This is especially true for commercial aircraft designers, which have avoided the problem of inlet flow distortion by placing engines away from the airframe in the free stream. As airframe designers have sought even higher performance, they have been led to designs such as blended wing or hybrid wing body aircraft that promise increased fuel economy when compared to traditional tube and wing designs. These designs can present distorted inflows to the propulsion engine.

Military aircraft have long been forced to deal with the problem of distorted inflow. The desire for low observability has led airframe designers to choose predominantly embedded engines on military aircraft such as fighter jets and UAVs. Related to this, there is a proven methodology for testing engine response to arbitrary total pressure distortion profiles. Along with this distortion creation methodology, there is also a standard for quantifying total pressure distortion, as described in SAE Recommended Practice ARP 1420.

In addition to the aircraft engine application, the present invention may be used in any fluid flow application where a specified complex flow field is required or desired.

BRIEF SUMMARY OF THE INVENTION

In one embodiment, the invention provides a method of making a flow-conditioning device such as a guide vane or airfoil for use in any application in which a detailed, complex flow field is desired. In this context, a flow field may consist of the total pressure and velocity distributions of the flow in a region. The velocity distributions may include local velocity magnitudes as well as flow direction (swirl).

In another embodiment, the present invention provides a method for the design and manufacture of flow profile-producing devices. The method utilizes computational procedures for the aerodynamic and mechanical design of a device that can alter a given incoming flow profile to a desired outlet flow profile.

In yet other embodiments, the present invention can achieve outlet flow profiles that may consist of any desired velocity field, including both axial and swirl components. In other embodiments, the flow conditioning devices of the present invention are designed using computational methods that optimize the geometry for its purpose.

In yet other embodiments, the present invention can produce arbitrary swirl combined with arbitrary total pressure profiles.

In other aspects, the present invention provides design approaches to the design of the flow-conditioning device, which may include: (1) the method of predicting/designing total pressure losses, (2) the vane placement scheme, and (3) the use of predicted downstream flow development to iteratively design the profile at the screen plane.

The advantages of the invention include, but are not limited to (1) the ability to produce a desired flow pattern directly from a CFD analysis, (2) the ability to produce any arbitrary total pressure profile, (3) the ability to produce any arbitrary swirl profile, (4) the ability to produce a combined total pressure and swirling flow profile (impossible in current practice), (5) improved accuracy in the profile that the device produces compared to current methods, and (6) reduced time and expense compared to current methods.

The invention produces both the total pressure losses and swirl profiles via specially designed vanes. However, these vanes differ from traditional guide vanes in that they are locally tailored to produce a certain swirl and total pressure loss. The freedom to produce more complex geometries allows the vanes to locally change in angle, chord length, and thickness. These parameters provide infinitely variable design control over total pressure and swirl angles at each local point in the flow. Thus, combined total pressure and swirl profiles are possible where traditional methods fail.

The methodology of the present invention may also be applied to creating flow-conditioning devices for commercial aircraft that may lead to an airframe-engine system without operability problems. To do so, the methodology allows for testing the effect of advanced airframe designs on engines, and potentially designing distortion-tolerant fans, using both total pressure and swirl. In other embodiments, the present invention allows engine and airframe manufacturers to examine the response of engines to new distortion environments within a high fidelity, controlled, test environment.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

In the drawings, which are not necessarily drawn to scale, like numerals may describe substantially similar components throughout the several views. Like numerals having different letter suffixes may represent different instances of substantially similar components. The drawings illustrate generally, by way of example, but not by way of limitation, a detailed description of certain embodiments discussed in the present document.

DETAILED DESCRIPTION OF THE INVENTION

Detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a representative basis for teaching one skilled in the art to variously employ the present invention in virtually any appropriately detailed method, structure or system. Further, the terms and phrases used herein are not intended to be limiting, but rather to provide an understandable description of the invention.

In one embodiment, the methodology of the present invention uses several basic approaches. First, it takes into account that a flow turning device is effective when it is placed perpendicular to the desired turning direction. Second, it may use experimental data from the literature, and/or CFD simulations, and applying this information, produce a turning by a cascade of airfoils based on prediction. Combining these two concepts, the present invention in one embodiment, creates rows of turning vanes everywhere perpendicular to the desired flow turning direction. This produces a flow turning device geometry that may be reproduced using additive manufacturing or similar techniques.

Figure 1:
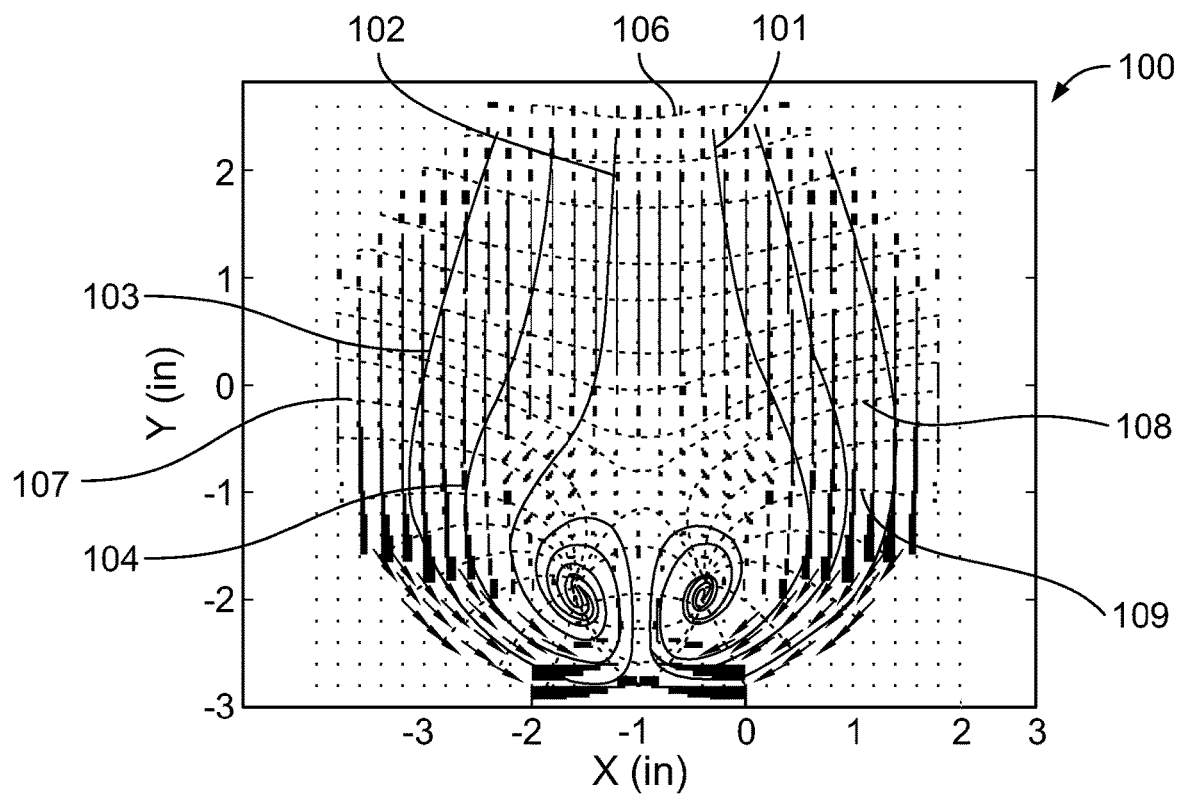
FIG. 1 is a vector plot of NASA Inlet-A, a profile from a boundary layer ingesting, embedded inlet. The solid lines are everywhere parallel to the flow while the dashed lines are everywhere perpendicular.

In inlet flow distortion analysis, the goal is to duplicate the desired flow in a real installation at a designated plane, termed the Aerodynamic Interface Plane or AIP. This plane serves as the coupling between airframe and engine. Once the desired three-component velocity profile is chosen at the AIP, the stream vane creates the desired velocity profile at its trailing edge from an assumed uniform inlet velocity profile. FIG. 1 shows a plot 100 of velocity vectors taken from the flow profile of NASA Inlet-A, which is a boundary layer ingesting embedded inlet. In FIG. 1, the solid lines, some of which are designated as 101-104, are everywhere parallel to the in-plane flow, while the dashed lines, some of which are designated as 106-109, are everywhere perpendicular.

The present invention then moves along each of these perpendicular lines to calculate the distance to at least one adjacent line. In other embodiments, the present invention calculates the distance to the nearest or two nearest neighboring lines at regular intervals. Along with calculating the vane's spacing, the original vector field is also queried to find the desired turning angle at each blade location. Using tabulated linear cascade data, the present invention then determines the vane angle of attack and camber line needed to produce the desired turning. The present invention controls vane solidity by using the previously calculated vane spacing and varying the chord.

Figure 2:
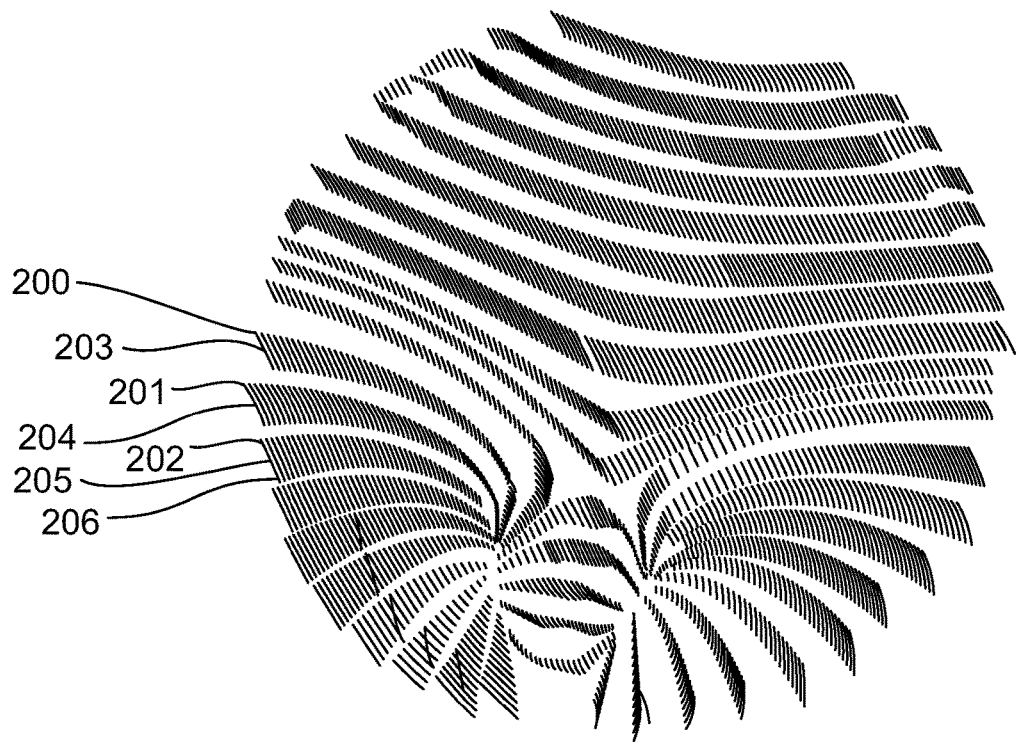
FIG. 2 is an isometric view of a stream vane design formed to produce the NASA Inlet-A profile, showing the leading edge blade lines, the numerous defining blade profiles lines beneath each blade line, and the trailing edge blade line which is formed by the end of the blade profiles.

The blade profiles and blade lines may then be exported to a CAD package. FIG. 2 shows the vane lines and profiles after they have been exported. FIG. 2 shows leading edge blade lines, some of which are identified as 200-202, a plurality of defining blade profile lines beneath each blade line, some of which are identified as 203-205, and the trailing edge blade line which is formed by the end of the blade profiles, such as 206.

Figure 3:
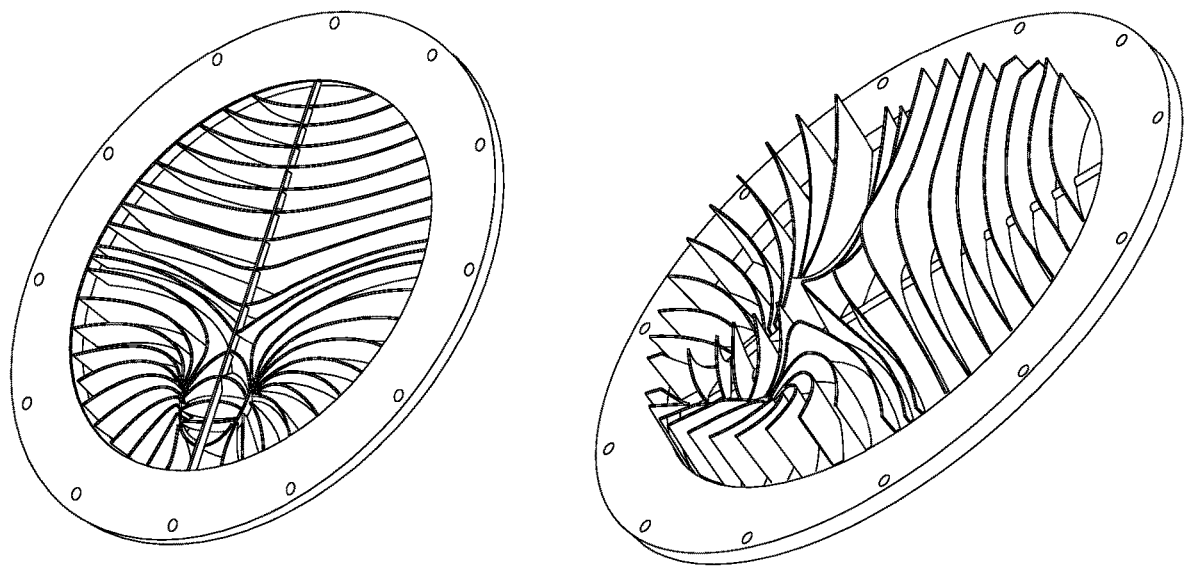
FIG. 3 shows a solid geometry formed from the blade geometry described in FIG. 2.

The blade profiles are then swept along their corresponding vane lines to create solid bodies. These solid blade bodies are then joined at vortex centers and structure and flanging is added as needed. A CAD model of a completed flow-conditioning device such as a screen is shown in FIG. 3.

Figure 4:
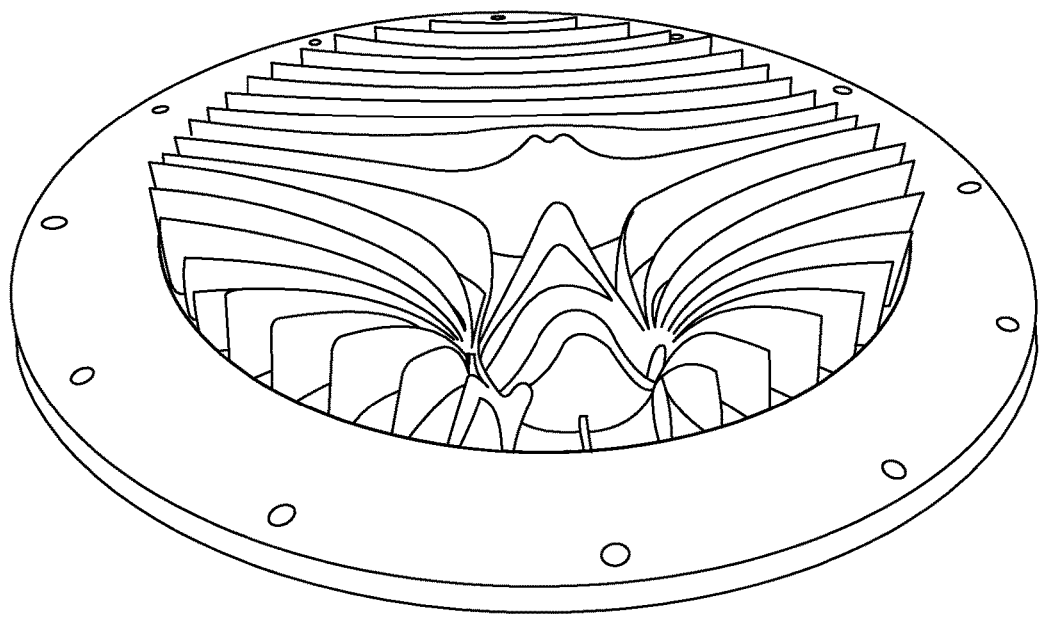
FIG. 4 shows a flow-conditioning device designed to reproduce the NASA Inlet-A flow profile printed in ABS plastic.

In other embodiments, the solid geometry is used to create a physical device. The geometry may be used with additive manufacturing or a similar technique to create a flow-conditioning device. FIG. 4 shows a swirl screen designed to produce NASA Inlet-A flow distortion after it has been printed in ABS plastic. This particular model was produced to be tested in a low speed wind tunnel.

In yet other embodiments, the present invention relies on several assumptions. First, the present invention considers that the flow around a single vane will be the same as it is downstream of a row of vanes with the same solidity, angle of attack, and vane shape. This allows the flow-conditioning device to be considered as consisting of many blade rows similar to linear cascades.

Figure 5:
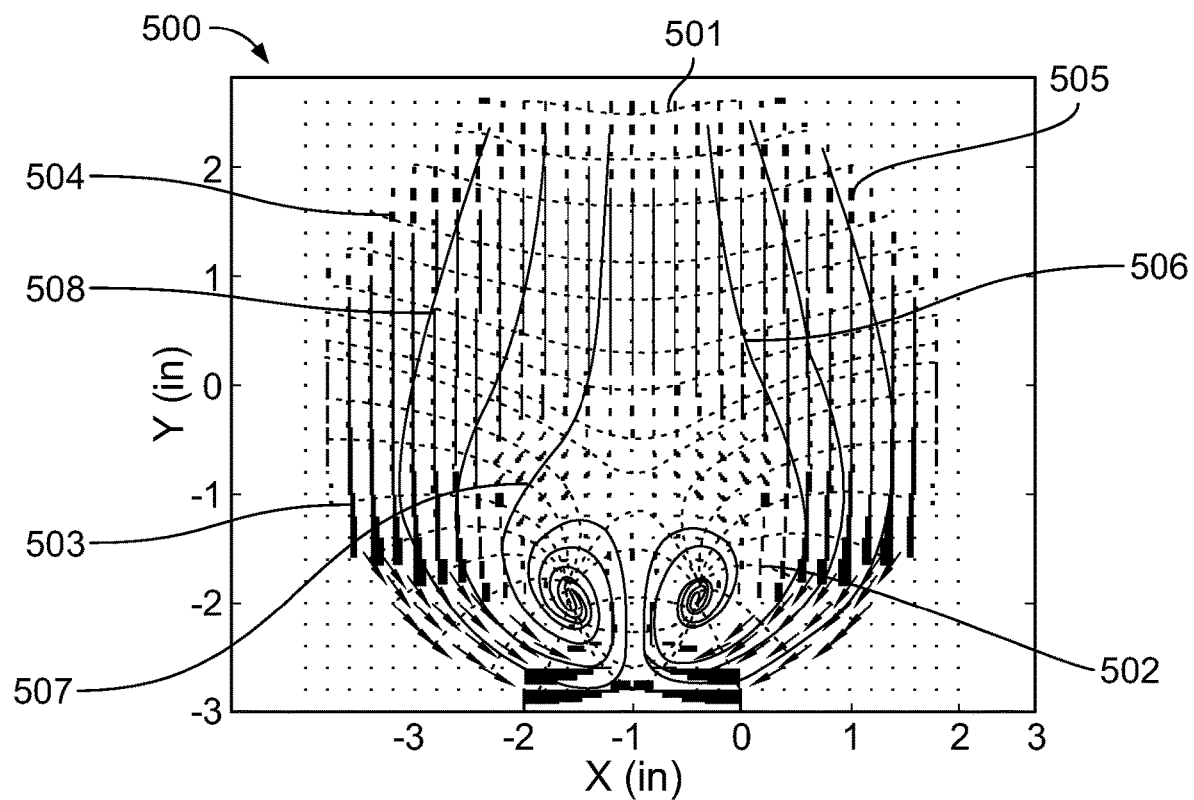
FIG. 5 shows a vector plot of NASA Inlet-A, a profile from a boundary layer ingesting, embedded inlet. The solid lines are everywhere parallel to the flow while the dashed lines are everywhere perpendicular.

As also shown in FIG. 5, plot 500 show how the vanes would be positioned along each dashed line, some of which are designated 501-504. One can then think of slicing the vanes along the solid lines, some of which are designated 505-508, parallel to the flow so as to produce a series of independent vanes, similar to a linear cascade. Unlike a linear cascade however, each of the vanes is designed for a different amount of turning. Another consideration is that the desired output turning of one vane will be close enough to that of its neighbors that it will still create turning similar to what it would if its neighbors were all likes of itself. This allows for the determination of what blade to use in each location by using linear cascade data.

The present invention may also assume that flat plate blades will behave similarly to those with an airfoil thickness profile. Even though additive manufacturing provides flexibility when it comes to what geometries can be created, there are still limitations to what can be made, especially with regard to very small features. To overcome the small features that would be present at the leading and trailing edges of flow-conditioning device such as airfoils, the present invention uses a thickness profile around the chamber line that is a simple flat plate with rounded leading and trailing edges. However, as additive manufacturing and other manufacturing methods improve, more complex and higher fidelity airfoil shapes may be produced.

In order to test the effectiveness of the present invention, a flow-conditioning device was tested in a wind tunnel to test the swirl distortion generation. The tunnel produced 50 m/s flow in a 6 inch diameter test section.

This tunnel can be set up in several different ways to provide flow measurements behind a distortion-generating device. The first configuration consists of a screen mounted in a rotating bearing driven by a stepper motor, along with a probe mounted in a linear traverse system.

The traverse system is composed of two linear traverses. The first one plunges the probe radially, while the second traverse moves the first and the probe axially; positioning the probe nearer or further from the screen. The traverse system can accept many different types of probes such as a pitot probe, pitot-static probe, multihole direction pressure probe, or hotwire probe. Combining the two linear traverse systems and the capability of the screens ability to rotate, the flow field can be measured at any location in the 3-dimensional volume downstream of the screen. This has proven to be useful by providing an easy and inexpensive way to test both total pressure and swirl distortion generation devices.

A second configuration allows flow behind a test screen to be measured using two cameras, using stereoscopic Particle Image Velocimetry (PIV). This configuration has the capability to measure all three components of velocity in any plane downstream of the screen all at once and in very fine detail. The equivalent traverse program would take much longer to take the equivalent measurements.

Figure 6:
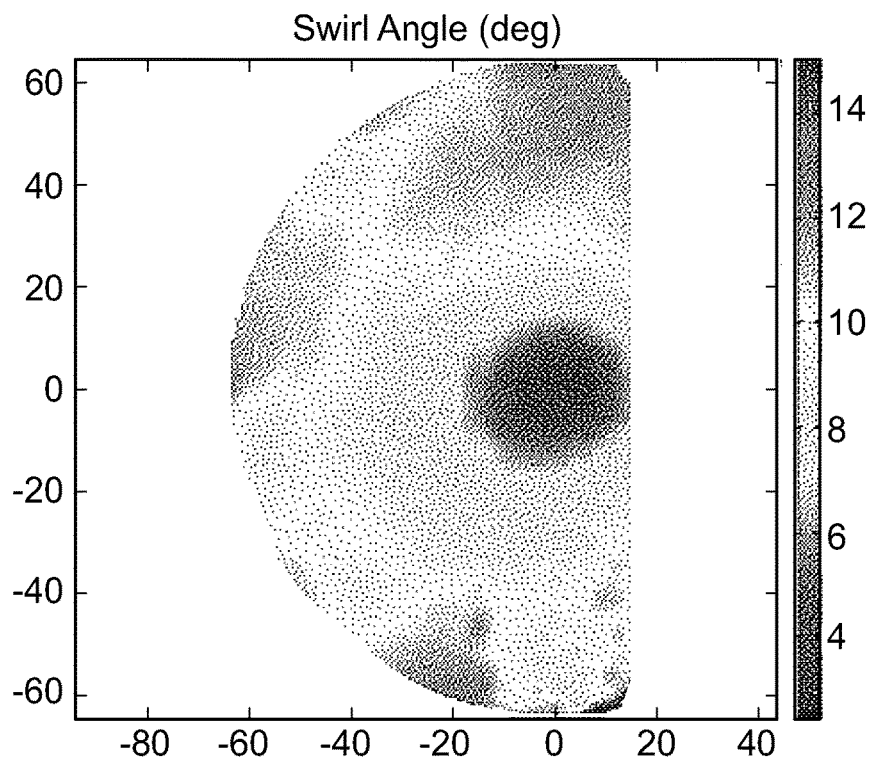
FIG. 6 shows a plot of swirl angle from a screen designed to produce a single bulk vortex. These data were derived from stereoscopic PIV data.

FIG. 6 shows a representative dataset acquired using this configuration. In order to test the instrumentation and manufacturing method of the present invention, a swirl distortion screen was designed to produce single bulk vortex pattern. FIG. 6 shows a plot of the swirl angles produced by a bulk swirl screen as derived from the stereoscopic PIV measurements taken four diameters downstream of the screen.

In other embodiments, the present invention provides a swirl distortion generation method capable of reproducing any desired swirl distortion profile. Along with the screen development method, a low speed tunnel capable of verifying the accuracy of the design is also provided.

In yet further embodiments, the present invention provides three flow stations that are defined as follows. Station 1 (the "inlet station") refers to the flow plane that enters the device. Station 2 (the device "outlet station") refers to the flow plane at the trailing edge of the device. Finally, Station 3 (the "instrumentation station") refers to the flow plane at which a certain profile is desired. This embodiment achieves the alteration of an incoming flow field by means of guide vanes that are locally optimized to produce the desired total pressure losses and flow turning as follows.

A known flow profile enters the device at Station 1. The local vane geometries produce total pressure losses and turning effects on the flow before it leaves the device at Station 2. By predicting the development of a complex flow field downstream of the device, the resulting profile at Station 3 is estimated. Following an iterative design method, the geometry of the device is altered until the desired Station 3 profile is achieved.

Prediction of downstream flow development is performed using vortex theory and computational fluids methods. The flow leaving the device will continue to develop and change profile as it flows. When a finite distance places the device upstream of the instrumentation plane, the flow reaching the instrumentation plane will be altered with respect to the flow leaving the device. Prediction of this flow alteration enables the iterative design of a device that produces the desired flow profile at the instrumentation plane by including downstream flow development effects.

The device is typically manufactured using additive manufacturing (3D printing) techniques, although other manufacturing techniques can be employed. With additive manufacturing, complex geometries can be produced to high levels of accuracy with no additional cost associated with complexity. In addition, the geometry of the device is not limited by traditional manufacturing techniques. By removing the "design for manufacture" constraints, geometries that are truly optimized for their purpose are possible.

In still further embodiments of the present invention, a process for making a fluid flow guide vane that transforms an input flow into a desired output flow is provided. The method is comprised of the following steps: 1) obtaining an array of desired velocity vectors from computational fluid dynamics or measurements from an experiment within the input flow; 2) creating lines on a plot representing lines everywhere parallel to the input flow; 3) creating vane lines on the plot represented by lines everywhere perpendicular to said parallel lines; 4) querying the input vector field to determine a turning angle that transforms the input flow into the desired output flow along the vane lines; and 5) using the turning angle to determine a vane geometry that transforms the input flow into the output flow at the vane lines. The vane geometry may then be outputted to an additive manufacturing system adapted to form a solid representation of the vane geometry at the vane lines or the vane geometry is outputted to any suitable manufacturing system adapted to form a solid representation of the vane geometry at the vane lines.

In other embodiments, the perpendicular lines are spaced at regular intervals. In addition, a seed line is used to create a first parallel line and the vane lines are created at predetermined intervals along the seed line. The method may also include a vane model that creates a vane geometry for the vane lines by using parameters including the distance to the nearest two vanes lines and the desired vane thickness and solidity.

In still further embodiments, a process for making a flow-conditioning device that transforms an input flow into a desired output flow is provided. The process comprising the steps of inputting into a computer program a set of design constraints representative of the input flow and the output flow, thus generating an output design representative of a flow conditioning device that transforms the input flow into the output flow and providing the output design to an additive manufacturing or other suitable production system adapted to form a solid representation of the flow conditioning device.

In some embodiments, the computer program is a computational fluid dynamic program. Also, the design constraints representative of the input flow and output flow are comprised of pressure and velocity distributions. In other embodiments, a design constraint places the fluid control device perpendicular to the fluid flow or places the fluid control device everywhere perpendicular to the local fluid flow. In still further embodiments, the design constraints are 1) representative of the input are comprised of pressure and velocity distributions, 2) representative of the output are comprised of pressure and velocity distributions and 3) place the fluid control device everywhere perpendicular to the fluid flow. Also, the computational fluid dynamic program may be adapted to make local design changes in angle, chord length and location, and thickness to create a final vane design.

While the foregoing written description enables one of ordinary skill to make and use what is considered presently to be the best mode thereof, those of ordinary skill will understand and appreciate the existence of variations, combinations, and equivalents of the specific embodiment, method, and examples herein. The disclosure should therefore not be limited by the above described embodiments, methods, and examples, but by all embodiments and methods within the scope and spirit of the disclosure.

What is claimed is:

1. A process for making a fluid flow guide vane that transforms an input flow into a desired output flow in a flow field of an aircraft, the process comprising the steps of:
    obtaining an array of desired velocity vectors within a desired flow profile at an aerodynamic interface plane (AIP) of the flow field;
    creating lines on a plot representing lines parallel to said desired flow profile based, at least in part, upon the array of desired velocity vectors;
    creating vane lines on said plot represented by lines perpendicular to said parallel lines;
    querying an input vector field to determine a turning angle that transforms said input flow into said desired output flow along the vane lines;
    using said turning angle to determine a vane geometry that transforms said input flow into an output flow at said vane lines, wherein said vane geometry is outputted to a manufacturing system adapted to form a solid representation of the vane geometry;
    manufacturing the fluid flow guide vane comprising the solid representation of the vane geometry, wherein the fabrication of the fluid flow guide vane by the manufacturing system is based upon the outputted vane geometry; and
    installing the fluid flow guide vane comprising the solid representation of the vane geometry at the AIP of the flow field of the aircraft, wherein the fluid flow guide vane produces the desired flow profile within the flow field during operation of the aircraft.

2. The method of claim 1 wherein said perpendicular lines are spaced at regular intervals.

3. The method of claim 1 wherein a seed line is used to create a first parallel line and said vane lines are created at predetermined intervals along said seed line.

4. The method of claim 1 wherein a vane model creates the vane geometry for said vane lines by using parameters including a distance to at least one adjacent vane line.

5. The method of claim 4 wherein the vane model creates the vane geometry for said vane lines by using parameters including the distance to the nearest two adjacent vane lines and a desired vane thickness and solidity.

6. The method of claim 1 wherein the array of desired velocity vectors is obtained from computational fluid dynamics or measurements from an experiment within the input flow.

7. The method of claim 1, wherein the vane geometry comprises one or more of change in angle, chord length or thickness of one or more vanes.

8. The method of claim 1, wherein the fluid flow guide vane comprises a mounting flange.

9. The method of claim 1, wherein the fluid flow guide vane is configured for use with an aircraft engine.

10. The method of claim 1, wherein the manufacturing system is an additive manufacturing system, and the fabrication of the fluid flow guide vane by the additive manufacturing system is controlled in response to the outputted vane geometry.

* * * * *